United States Patent
Kamimura et al.

(10) Patent No.: US 9,868,656 B2
(45) Date of Patent: Jan. 16, 2018

(54) WASTEWATER TREATMENT DEVICE

(75) Inventors: Kazuhide Kamimura, Kobe (JP); Makoto Ishino, Kobe (JP); Shigeru Yoshioka, Kobe (JP); Hozumi Otozai, Kobe (JP); Seiichi Terakura, Tokyo (JP); Hideo Suzuki, Tokyo (JP); Gaku Kondo, Tokyo (JP)

(73) Assignee: MITSUBISHI HEAVY INDUSTRIES MECHATRONICS SYSTEMS, Kobe-shi (JP)

( * ) Notice: Subject to any disclaimer, the term of this patent is extended or adjusted under 35 U.S.C. 154(b) by 0 days.

(21) Appl. No.: 14/358,054

(22) PCT Filed: Apr. 3, 2012

(86) PCT No.: PCT/JP2012/059026
§ 371 (c)(1),
(2), (4) Date: May 14, 2014

(87) PCT Pub. No.: WO2013/099304
PCT Pub. Date: Jul. 4, 2013

(65) Prior Publication Data
US 2014/0311959 A1    Oct. 23, 2014

(30) Foreign Application Priority Data

Dec. 28, 2011  (JP) .................. 2011-290162

(51) Int. Cl.
*C02F 1/44* (2006.01)
*C02F 1/469* (2006.01)
(Continued)

(52) U.S. Cl.
CPC ............ *C02F 1/52* (2013.01); *C02F 1/441* (2013.01); *C02F 1/4695* (2013.01); *C02F 3/121* (2013.01);
(Continued)

(58) Field of Classification Search
CPC .... C02F 1/441; C02F 1/52; C02F 1/70; C02F 1/5245; C02F 3/00; C02F 3/1273;
(Continued)

(56) References Cited

U.S. PATENT DOCUMENTS

| 5,804,057 A * | 9/1998 | Zhou ................... C02F 1/46109 204/252 |
| 2005/0016922 A1* | 1/2005 | Enzweiler ............ B01D 61/022 210/639 |
| 2008/0185294 A1* | 8/2008 | Cai ....................... C02F 1/4604 205/747 |

FOREIGN PATENT DOCUMENTS

| CN | 102211803 A | 10/2011 |
| JP | 63-258690 A | 10/1988 |

(Continued)

OTHER PUBLICATIONS

Machine translation of JP 2004-314009 to Sugawara et al. (2004) (obtained from JPO Oct. 2015).*

(Continued)

*Primary Examiner* — Lucas Stelling
(74) *Attorney, Agent, or Firm* — Westerman, Hattori, Daniels & Adrian (57) ABSTRACT

Provided is a wastewater treatment device that can reduce the fluoride ion concentration in industrial wastewater to improve the recovery rate of purified water. A wastewater treatment device (1) includes a biological treatment unit (3) that decomposes and eliminates organic matter in wastewater by means of microorganisms, and a desalinization unit (4) that is provided downstream of the biological treatment unit (3) and eliminates salt-forming ionic components from within the wastewater. A pretreatment unit (2), which removes components, such as heavy metals or oil contained in the wastewater, which inhibit the function of the biological treatment unit (3) or the desalinization unit (4), is (Continued)

provided upstream of the biological treatment unit (3), and the pretreatment unit (2) is provided with a fluoride concentration reduction unit that reduces the concentration of fluoride ions in the wastewater by eliminating the fluoride ions from within the wastewater.

4 Claims, 5 Drawing Sheets

(51) Int. Cl.
*C02F 1/52* (2006.01)
*C02F 3/12* (2006.01)
*C02F 9/00* (2006.01)
C02F 101/14 (2006.01)
C02F 101/20 (2006.01)
C02F 101/32 (2006.01)

(52) U.S. Cl.
CPC ............ *C02F 3/1273* (2013.01); *C02F 9/00* (2013.01); *C02F 1/5245* (2013.01); *C02F 3/12* (2013.01); *C02F 2001/5218* (2013.01); *C02F 2101/14* (2013.01); *C02F 2101/20* (2013.01); *C02F 2101/32* (2013.01); *C02F 2303/24* (2013.01); *Y02W 10/15* (2015.05)

(58) Field of Classification Search
CPC .... C02F 3/12; C02F 2101/32; C02F 2101/14; C02F 2001/5218; C02F 2303/24; C02F 1/26; C02F 1/265441; C02F 1/4604; C02F 1/265; C02F 1/469; C02F 1/4693; C02F 1/4695; C02F 1/4696; C02F 1/4698; C02F 3/121; C02F 2101/20; Y02W 10/15
See application file for complete search history.

(56) References Cited

FOREIGN PATENT DOCUMENTS

| | | | |
|---|---|---|---|
| JP | 5-277492 | A | 10/1993 |
| JP | 7-39870 | A | 2/1995 |
| JP | 8-39058 | A | 2/1996 |
| JP | 2000-229289 | A | 8/2000 |
| JP | 2001-54792 | A | 2/2001 |
| JP | 2001-70989 | A | 3/2001 |
| JP | 2001-96281 | A | 4/2001 |
| JP | 3375154 | B2 | 2/2003 |
| JP | 2003-236584 | A | 8/2003 |
| JP | 2004-122059 | A | 4/2004 |
| JP | 2004-314009 | A | 11/2004 |
| JP | 2006-21173 | A | 1/2006 |
| JP | 2006-159129 | A | 6/2006 |
| JP | 2006-320865 | A | 11/2006 |
| JP | 2008-302333 | A | 12/2008 |
| JP | 2010-207755 | A | 9/2010 |
| JP | 4625280 | B2 | 2/2011 |

OTHER PUBLICATIONS

International Search Report dated Jun. 12, 2012 issued in corresponding application No. PCT/JP2012/059026.
Written Opinion of the International Searching Authority dated Jun. 12, 2012 issued in corresponding application No. PCT/JP2012/059026.
Decision of Patent Grant dated Feb. 9, 2016, issued in counterpart Japanese Patent Application No. 2011-290162, with English translation. (7 pages).
Office Action dated Oct. 11, 2016, issued in counterpart Chinese Application No. 201280055882.0, with English translation (16 pages).
English translation of Notice of Allowance for Singapore Patent Application dated Oct. 11, 2016. Application No. 11201402217Q, "The Notice of Allowance has been received" (2 pages).

* cited by examiner

WASTEWATER TREATMENT DEVICE

TECHNICAL FIELD

The present invention relates to a wastewater treatment device for purifying and treating industrial wastewater in order to reuse the industrial wastewater.

BACKGROUND ART

Industrial wastewater from plants is subjected to purifying treatment, such as elimination of heavy metal components, suspended particles, and the like and decomposition and elimination of organic matter by microorganisms. Although the treated water subjected to the purifying treatment is generally discharged into the environment, the treated water obtained by subjecting the industrial wastewater to the purifying treatment is reused for industrial water in places where it is difficult to secure industrial water. In this case, as described in PTL 1, the desalination treatment of eliminating ionic components contained in the wastewater is performed after the heavy metal components, the suspended particles, the organic matter, and the like are eliminated.

In a wastewater treatment device of PTL 1, an electrodialysis method, a reverse osmotic method, and an ion-exchange resin method are applied as the desalination treatment. In the electrodialysis method, the ionic components in the wastewater are eliminated using energization and an ion exchange membrane. In the reverse osmotic method, the ionic components in the wastewater are eliminated using a reverse osmosis membrane. Additionally, in the ion-exchange resin method, the ionic components in the wastewater are eliminated using an ion exchange resin.

CITATION LIST

Patent Literature

[PTL 1]: Japanese Unexamined Patent Application Publication No. 2003-236584 (Claim 1, Paragraphs [0022] and [0050], and FIG. 1])

SUMMARY OF INVENTION

Technical Problem

Salts containing calcium, such as calcium carbonate, calcium sulfate (plaster), and calcium fluoride, are dissolved in the wastewater. The aforementioned salts in the wastewater are concentrated in the desalination treatment using the ion exchange membrane or the reverse osmosis membrane. If the condition in which the salts exceed saturation solubility due to the concentration is brought about, the aforementioned salts are deposited on the surface of the ion exchange membrane or the reverse osmosis membrane as scales. For this reason, the membrane is clogged and blocked due to scales, and desalination treatment capacity declines. Particularly, calcium fluoride has low saturation solubility, and is a scale component that is easily deposited.

In the ion-exchange resin method, from the restrictions of the ion exchange capacity of the ion exchange resin, a large amount of ion exchange resin is needed and treatment costs are increased when the dissolved salts concentration in the wastewater is equal to or greater than 500 mg/l. Generally, since dissolved salts concentration exceeds 1000 mg/l in industrial wastewater, the ion-exchange resin method is not suitable for treatment of the industrial wastewater.

In order to prevent generation of scales, generally, scale inhibitors, such as phosphonate-based scale inhibitors (a trade name: PC191 made by Ondeo Nalco Company, and a trade name: Kimic SI made by Kimic Chemitech(s) Pte., Ltd.), are added into the wastewater. By adding a scale inhibitor, in the case of calcium fluoride, deposition of scales can be prevented even if calcium fluoride is concentrated to about 20 times the saturation solubility in water.

However, even if the scale inhibitor is added, when the fluoride ion concentration in source water is high, the saturation solubility of calcium fluoride is reached even if the concentration rate is low. For this reason, the recovery rate of purified water is suppressed to be low.

An object of the invention is to provide a wastewater treatment device that can reduce the fluoride ion concentration in industrial wastewater to improve the recovery rate of purified water.

Solution to Problem

In order to solve the aforementioned problems, the invention provides a wastewater treatment device including a biological treatment unit that decomposes and eliminates organic matter in wastewater by means of microorganisms; and a desalinization unit that is provided downstream of the biological treatment unit and eliminates salt-forming ionic components in the wastewater. A fluoride concentration reduction unit that is provided upstream of the biological treatment unit and reduces the concentration of fluoride ions in the wastewater by eliminating the fluoride ions from within the wastewater.

As described above, salts containing fluoride, particularly, calcium fluoride, in the wastewater has extremely low solubility with respect to the water. The solubility product of the calcium fluoride with respect to the water is expressed by Formula (1).

$$\text{Solubility product } K_{sp} = [Ca^{2+}\text{Concentration}] \times [F\text{-concentration}]^2 \text{ (unit is mol concentration)} \quad (1)$$

The solubility product $K_{sp}$ is a constant at a constant temperature. Since the solubility product $K_{sp}$ is proportional to the square of the fluoride ion concentration in the wastewater, if the F-concentration in the wastewater is reduced upstream of the desalinization unit, a scale deposition preventing effect is exhibited. As a result, it is possible to enhance the recovery rate of the water in the desalinization unit.

The invention provides the fluoride concentration reduction unit that reduces the concentration of the fluoride ions in the wastewater. In order to reduce the concentration of the fluoride ions in the wastewater, it is industrially advantageous to adopt means for depositing the fluoride ions as a salt containing fluoride or means for co-precipitating the fluoride ions with other salts. However, suspended particles are generated in the wastewater in this process. When the suspended particles flow into the desalinization unit, there is a probability that the membrane in the desalinization unit may be blocked.

In the biological treatment unit, suspended matter, such as sludge, and the wastewater are separated and only the wastewater is transported to the desalinization unit. Accordingly, if the fluoride concentration reduction unit is installed upstream of the biological treatment unit, the suspended particles generated by the fluoride concentration reduction means are eventually separated from the wastewater in the biological treatment unit, and the wastewater that does not contain the suspended particles can be supplied to the desalinization unit. Since it is not necessary to install a device that separates a solid and a liquid between the biological treatment unit and the desalinization unit, the device is simplified, which is advantageous.

In the aforementioned invention, the fluoride concentration reduction unit includes a seed crystal feeding unit that allows seed crystals to be fed into the wastewater.

In the aforementioned invention, the seed crystals are directly fed into in the wastewater in the fluoride concentration reduction unit. By doing this, the fluoride ions or salt-forming ions (for example, calcium ions) contained in the wastewater, and the seed crystals are efficiently brought into contact with each other. For this reason, the salts containing fluoride are easily deposited on the surfaces of the seed crystals, and the elimination rate of fluoride from the wastewater can be improved.

In this case, preferably, the wastewater treatment device further includes a circulation unit that precipitates the seed crystals after salts containing fluoride are deposited, and re-feeds the precipitated seed crystals into the wastewater.

When the salts containing fluoride are deposited on the surfaces, the seed crystals are enlarged. However, if the seed crystals have a certain degree of size, the seed crystals are naturally divided. The salts containing fluoride also deposit on the surfaces of the seed crystals that have been divided and become small. In this way, the seed crystals can be reused within the system of the wastewater treatment device.

If the seed crystals on which the salts containing fluoride have been deposited are precipitated and recovered and are re-fed into the wastewater with a high fluoride ion concentration, the utilization efficiency of the seed crystals can be enhanced, which is advantageous.

Otherwise, in the aforementioned invention, the fluoride concentration reduction unit includes a vessel and a fluidized bed that is stored within the vessel and stores seed crystals therein. The wastewater is supplied from a lower side of the vessel, and when the wastewater passes through the fluidized bed, salts containing fluoride are deposited on the surfaces of the seed crystals to reduce the concentration of the fluoride ions in the wastewater.

When the fluoride concentration reduction unit to which the fluidized bed is applied is adopted in this way, the salts containing fluoride can be deposited on the surfaces of the seed crystals, and the fluoride ion concentration in the wastewater can be reduced.

Otherwise, in the aforementioned invention, the fluoride concentration reduction unit includes a flocculant feeding unit that feeds an aluminum-based flocculant into the wastewater.

In this way, when the fluoride concentration reduction unit to which the aluminum-based flocculant is applied is adopted, and the fluoride is precipitated together with aluminum hydroxide, the fluoride ion concentration in the wastewater can be reduced.

Advantageous Effects of Invention

According to the invention, since the fluoride ion concentration in the wastewater is reduced, generation of scales in the desalinization unit can be suppressed. As a result, it is possible to enhance the recovery rate of the water in the desalinization unit.

DESCRIPTION OF EMBODIMENTS

Figure 1:
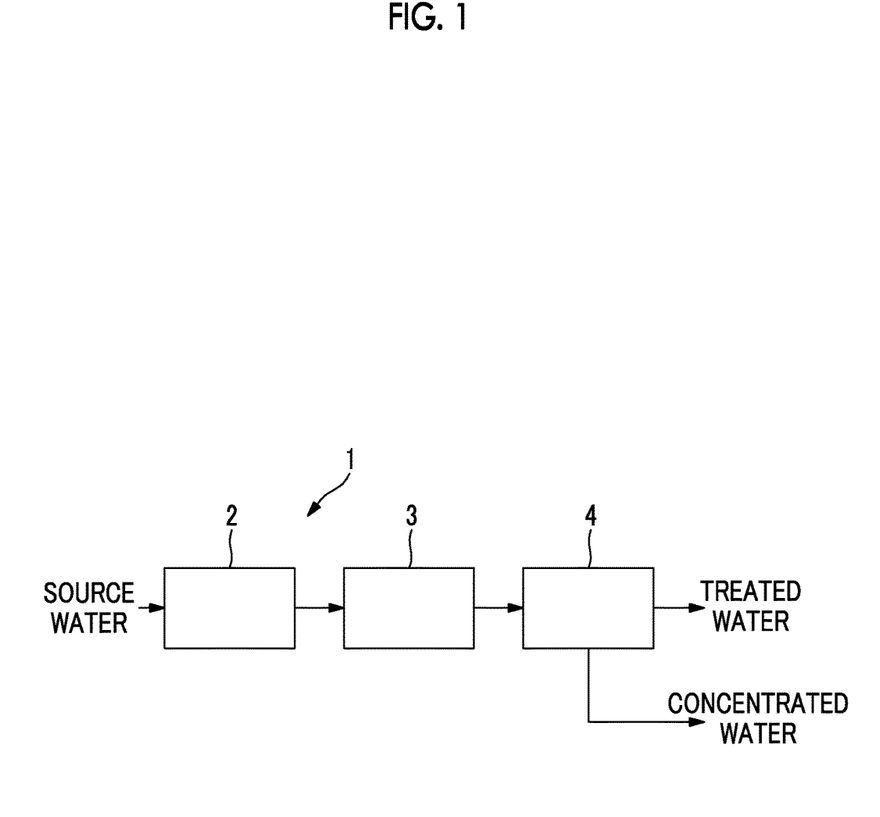
FIG. 1 is a block diagram of a wastewater treatment device.

A block diagram of a wastewater treatment device is shown in FIG. 1. The wastewater treatment device 1 includes a pretreatment unit 2, a biological treatment unit 3, and a desalinization unit 4 from an upstream side in order.

At least fluoride ions and calcium ions as scale components are contained in the wastewater (source water) from a plant to be treated in the wastewater treatment device 1.

The pretreatment unit 2 receives source water from a plant, and eliminates oil, heavy metals, suspended particles, or the like in the source water.

The biological treatment unit 3 decomposes organic matter in the wastewater treated in the pretreatment unit by means of microorganisms. The biological treatment unit 3 has a configuration or the like in which a treatment device (MBR: Membrane Bio-Reactor) using a membrane-separation activated sludge method, a treatment device (BFR: Bio-Film Reactor) using a biofilm method, an aeration tank, and a precipitation tank are combined. The biological treatment unit 3 may have a configuration in which MBR and BFR are combined. In the case of the configuration in which the aeration tank and the precipitation tank are combined, in order to prevent blocking in a desalinization device of the desalinization unit 4, filtering devices, such as a filter, are provided behind a precipitation tank.

In MBR, a membrane having pores of about 0.1 µm is immersed in the wastewater in a biological reactor. Microorganisms are present in the wastewater in the biological reactor and the organic matter is decomposed by the microorganisms in the wastewater. The microorganisms that are useful for the sludge treatment in the biological reactor have a size of about 0.25 µm at minimum. Accordingly, the wastewater in the biological reactor is separated into a solid and a liquid as the microorganisms and the wastewater by the membrane, and only the wastewater is discharged from MBR.

A support having a film of the microorganisms formed on the surface thereof is installed inside BFR. When the microorganisms on the surface of the support comes into contact with the wastewater, the microorganisms decompose the organic matter in the wastewater.

In the case of the configuration in which MBR and BFR are combined, the operation of MBR and BFR is controlled according to the quantity (COD) of the organic matter in the wastewater. For example, only MBR is operated when COD in the wastewater is low. When fluctuations of COD are large, BFR is operated in parallel with MBR.

The desalinization unit 4 eliminates ions contained in the wastewater. The desalinization unit 4 has a reverse osmosis membrane type water demineralizer or an electrostatic desalinization device.

In the reverse osmosis membrane type water demineralizer, a reverse osmosis membrane (RO membrane) allows only water to permeate therethrough. The water (treated water) permeating through the reverse osmosis membrane is reused as industrial water. Wastewater (concentrated water)

in which ions are concentrated is present upstream of the reverse osmosis membrane. The concentrated water is discharged out of the system of the wastewater treatment device 1 by being discharged from the reverse osmosis membrane type water demineralizer.

The electrostatic desalinization device has a pair of porous electrodes that face each other, an anion-exchange membrane is installed on a positive electrode side, and a cation-exchange membrane is installed on a negative electrode side. The wastewater is allowed to flow between the electrodes.

If an electric current is applied so that a positive electrode becomes plus and a negative electrode becomes minus, anions in the wastewater move to the positive electrode side, permeate through the anion-exchange membrane, and are adsorbed onto the porous positive electrode. In contrast, cations in the wastewater move to the negative electrode side, are permeated through the cation-exchange membrane, and are adsorbed on the porous negative electrode. Accordingly, the ions in the wastewater when flowing between the electrodes are eliminated, and the treated water is recovered. The recovered treated water is reused as the industrial water. If the electrostatic desalinization device is used, since the recovery rate of water can be improved further than that of the reverse osmosis membrane type water demineralizer, this is advantageous.

When predetermined time has lapsed, water conduction is cut off, and the positive electrode is turned minus and the negative electrode is turned plus by reversing electric currents applied to the respective electrodes. By doing this, the ions adsorbed on the porous electrodes are released, are permeated through the ion exchange membranes, and are moved into the wastewater. Then, the wastewater containing the ions is discharged from the electrostatic desalinization device, and is discharged out of the system of the wastewater treatment device 1 as a drain.

When the fluoride ion concentration in the wastewater to be treated in the desalinization unit 4 is high, scales are generated even if a scale inhibitor is added. In the case of the reverse osmosis membrane type water demineralizer, the upstream side of the reverse osmosis membrane is always exposed to the wastewater with a high ion concentration. Therefore, once scales are generated and adhere to the reverse osmosis membrane, the scales grow easily. In the case of the electrostatic desalinization device, the wastewater is periodically discharged out of the device. Thus, although scales are less likely to be generated than in the case of the reverse osmosis membrane, if the scale adheres to the ion exchange membrane similar to the reverse osmosis membrane type water demineralizer, the scale may grow and the membrane may be blocked. Accordingly, the wastewater treatment device 1 includes a fluoride concentration reduction unit upstream of the desalinization unit 4.

In the wastewater treatment device 1, the fluoride concentration reduction unit is installed upstream of the biological treatment unit 3. That is, the fluoride concentration reduction unit may be installed inside the pretreatment unit 2, or may be installed between the pretreatment unit 2 and the biological treatment unit 3.

(First Embodiment)

Figure 2:
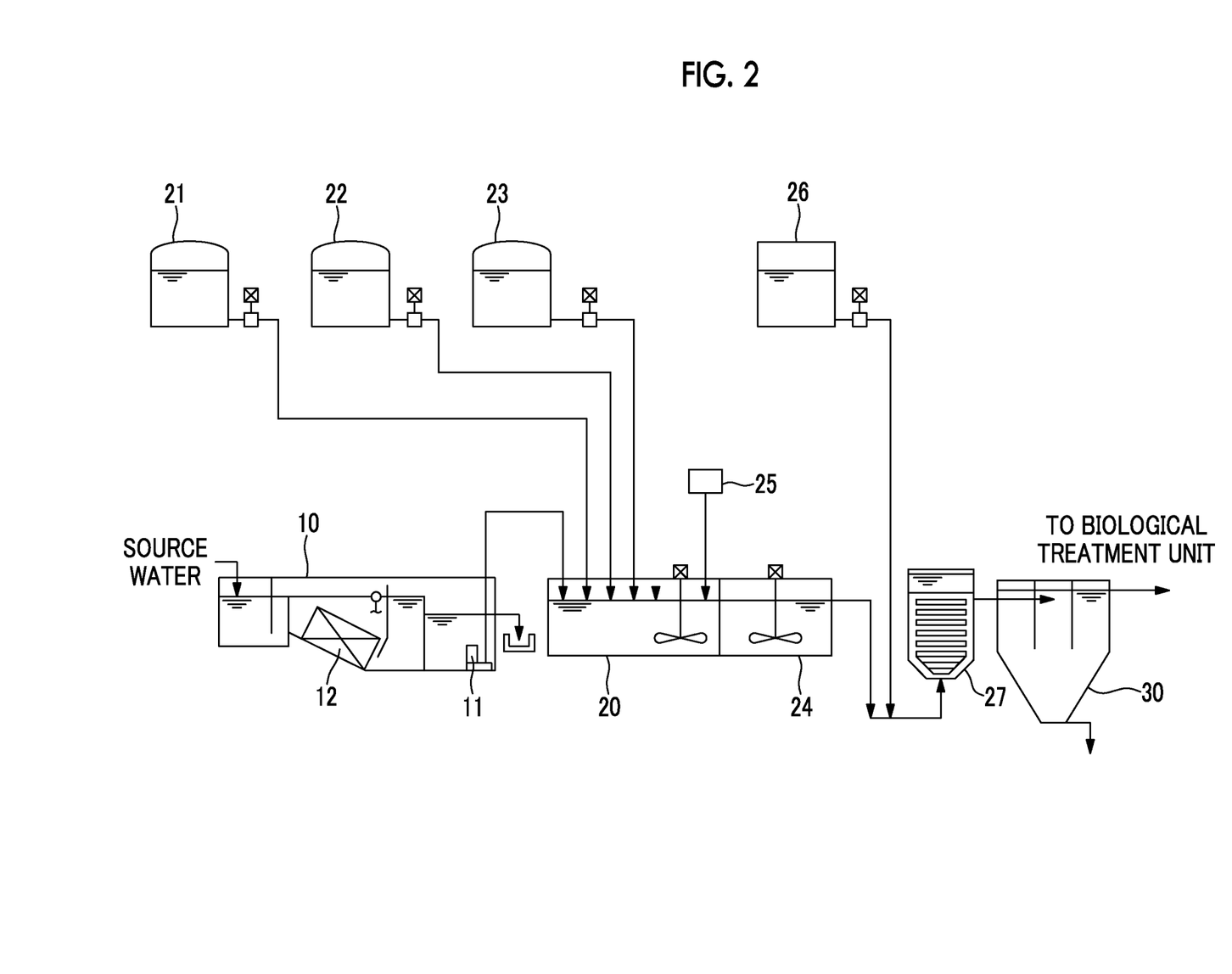
FIG. 2 is a schematic view of a pretreatment unit of a wastewater treatment device related to a first embodiment.

FIG. 2 is a schematic view of a pretreatment unit of a wastewater treatment device related to a first embodiment.

An oil separation device 10 of the pretreatment unit of the wastewater treatment device of the first embodiment receives the wastewater (source water) from a plant. In the oil separation device 10, an inclined portion is provided within a tank, and an oil separator 12 is installed at the inclined portion. The oil separator 12 has a configuration in which a plurality of corrugated-plates are arranged. When the source water that has flowed into the oil separation device 10 passes through the oil separator 12, the oil contained in the source water floats on the surface of the water. The oil that floats on the surface of the water is recovered and discharged. The wastewater from which the oil is eliminated is discharged from the oil separation device 10 by a submerged pump 11. In FIG. 2, the submerged pump is installed within the tank (in the wastewater) of the oil separation device 10, but a configuration in which a pump is installed outside the tank may be used.

The wastewater discharged from the oil separation device 10 is transported to a reaction vessel 20. A chelate tank 21, a flocculant tank 22, and an alkali tank 23 are connected to the reaction vessel 20.

The chelate tank 21 holds a liquid chelating agent. The liquid chelating agent includes a trade name: EPOFLOCK L-1 made by Miyoshi Oil & Fat Co., Ltd., a trade name: TX-10 made by Toso Company Limited, a trade name: Kimic CL made by Kimic Chemitech(s) Pte., Ltd., a trade name: TMT 15 made by Evonik Degussa Japan Co., Ltd., or the like. A predetermined amount of liquid chelating agent is supplied to the wastewater in the reaction vessel 20 from the chelate tank 21. The liquid chelating agent chelates and insolubilizes heavy metals (Cr, Hg, Ag, Cu, Pb, Cd, Zn, Ni, Co, Fe, Mn, and the like) contained in the wastewater, in the reaction vessel 20.

The flocculant tank 22 holds a flocculant. An iron-based flocculant water solution is used as the flocculant. The iron-based flocculant includes ferric chloride ($FeCl_3$), poly ferric sulfate, or the like. A predetermined amount of flocculant is supplied from the flocculant tank 22 to the wastewater in the reaction vessel 20. In the reaction vessel 20, the flocculant flocculates chelate compounds and suspended particles of the heavy metals that are contained in the wastewater. Accordingly, large flocs containing the chelate compounds and the suspended particles of the heavy metals are created.

A stirring device is installed in the reaction vessel 20, and the flocs of the chelate compounds and the suspended particles of the heavy metals are in a suspended state within the reaction vessel 20.

The alkali tank 23 holds alkaline water solutions, such as an NaOH water solution. pH of the wastewater in the reaction vessel 20 is controlled, and a predetermined amount of alkaline water solution is supplied from the alkali tank 23 to the reaction vessel 20 so as to fall within a predetermined pH range. The wastewater is preferably controlled at about pH 6 to pH 9.5 when a fluoride elimination rate is taken into consideration.

The reaction vessel 20 and an aging tank 24 are arranged side by side via a partition wall. The water surface of the wastewater in the reaction vessel 20 is set to be higher than the water surface of the wastewater in the aging tank 24. Accordingly, the wastewater in the reaction vessel 20 flows into the aging tank 24 over the partition wall due to a water surface difference. The flocs also flow into the aging tank 24 together with the wastewater.

The fluoride concentration reduction unit in the first embodiment is constituted by a seed crystal feeding unit 25, the aging tank 24, and a precipitation tank 30.

Seed crystals are fed into the wastewater from the seed crystal feeding unit 25. In FIG. 2, the seed crystal feeding unit 25 is allowed to feed the seed crystals into the reaction vessel 20. In the present embodiment, the seed crystals include those capable of depositing fluoride compounds, such as calcium fluoride ($CaF_2$) and fluoroapatite ($Ca_5(PO_4)_3F$), as salts containing fluoride on surfaces thereof. Specifically, rock phosphate, fluorite, calcium carbonate, and the like are used. The seed crystals are fed, for example, into the vicinity of the partition wall of the reaction vessel 20. By doing this, the seed crystals are likely to flow from the reaction vessel 20 into the aging tank 24 together with the wastewater. Otherwise, the seed crystals may be allowed to be fed into the wastewater in the aging tank 24 from the seed crystal feeding unit 25.

A stirring device is installed in the aging tank 24. The flocs of the chelate compounds and the suspended particles of the heavy metals, and the seed crystals are in a suspended state within the aging tank 24.

In the aging tank 24, the aforementioned fluoride compounds (salts containing fluoride) are deposited on the surfaces of the seed crystals. The concentration of the fluoride ions contained in the wastewater is reduced due to the deposition of the fluoride compounds. The retention time of the wastewater in the aging tank 24 is set so as to be longer than the retention time in the reaction vessel 20.

The fluoride compounds grow isotropically on the surfaces of the seed crystals, and the seed crystals are enlarged. However, if the crystals become large, the fluoride compounds that are deposited on the surfaces of the crystals grow anisotropically. Accordingly, strain is generated within the crystals and the seed crystals are divided naturally. The fluoride compounds are deposited on the surfaces of the seed crystals that are divided and become small.

The wastewater containing the seed crystals and the flocs is discharged from the aging tank 24, and is transported to a granulation tank 27. In FIG. 2, a polymer tank 26 connects the aging tank 24 and the granulation tank 27. The polymer tank 26 holds a polymer flocculant. The polymer flocculant includes an anionic polymer flocculant, a cationic polymer flocculant, or a nonionic polymer flocculant, and specifically, includes an anionic polymer (a trade name: Hishifloc 305 made by Mitsubishi Heavy Industries Mechatronics Systems, Ltd.). A predetermined amount of polymer flocculant is supplied into the wastewater from the polymer tank 26.

In the present embodiment, the polymer tank 26 may be connected to the granulation tank 27, and the aforementioned polymer flocculant may be fed into the granulation tank 27. In the granulation tank 27, the flocs (the chelate compounds and the suspended particles) and sludge are made to adhere to the surfaces of the seed crystals, and particles with slow sedimentation velocity also sediment quickly.

The wastewater discharged from the granulation tank is transported to the precipitation tank 30. In the precipitation tank 30, the flocs of the chelate compounds and the suspended particles of the heavy metals, and the seed crystals on which the fluoride compounds have been deposited at the bottom of the precipitation tank 30. The precipitated flocs and seed crystals are discharged out of the system of the pretreatment unit 2 (wastewater treatment device 1) from the bottom of the precipitation tank 30. The wastewater from which the flocs and the seed crystals are precipitated and eliminated is discharged out of the precipitation tank 30 from the vicinity of the liquid surface of the wastewater in the precipitation tank 30. The wastewater discharged from the precipitation tank is transported to the biological treatment unit 3 at the subsequent stage.

As the flocs and the seed crystals are larger, the rate of precipitating in the precipitation tank 30 becomes fast. When it is necessary to perform high-speed precipitation, as shown in FIG. 2, the granulation tank 27 is provided. In contrast, when the high-speed precipitation is not required, it is possible to omit the granulation tank 27. In this case, it is preferable to adopt a configuration in which the polymer tank 26 is connected with the aging tank 24 and the polymer flocculant is supplied into the aging tank 24.

In the present embodiment, the fluoride ion concentration in the wastewater transported to the biological treatment unit 3 is reduced compared to that of the source water. Additionally, since the wastewater is discharged from an upper portion of the precipitation tank 30, the amount of the suspended particles in the wastewater transported to the biological treatment unit 3 is substantially reduced compared to that in the wastewater in the reaction vessel 20 or the aging tank 24. Moreover, the wastewater and the suspended particles are separated by being passed through MBR of the biological treatment unit 3. For this reason, the wastewater transported to the desalinization unit 4 does not contain the suspended particles while the fluoride ion concentration thereof is reduced. For this reason, generation of scales on the reverse osmosis membrane or the ion exchange membrane of the desalinization unit 4 can be suppressed.

The calculation results of the fluoride ion concentration and the calcium ion concentration in the wastewater and the supersaturation magnification of the calcium fluoride, when the wastewater is treated without adding the seed crystals, are shown in Table 1. When fluoride treatment is not performed, the fluoride (F−) concentration and calcium ($Ca^{2+}$) concentration in the wastewater that flows into the desalinization unit are the same as those in the source water. The water recovery rate represents the ratio of the amount of the treated water to the amount of the wastewater that has flowed into the desalinization unit 4. The concentrations of the fluoride ions and the calcium ions in the water recovery rates of 30% and 50% are values of the respective ions in the concentrated water in the desalinization unit. The supersaturation magnification represents the concentration of $CaF_2$ dissolved in the wastewater when a $CaF_2$-saturated water solution ($K_{sp}$=0.052 at 25° C.) is 1.

TABLE 1

|  | Source water | Water Recovery Rate 30% | Water Recovery Rate 50% |
| --- | --- | --- | --- |
| Fluoride Ion (mg/l) | 6.5 | 9.2 | 13 |
| Calcium Ion (mg/l) | 135 | 192 | 270 |
| Calcium Fluoride Supersaturation Magnification (Number of Times) | 7.6 | 21 | 59 |

When the wastewater to which PC191 is added in the concentration of 4 mg/l as a scale inhibitor is treated, it is experimentally confirmed that the deposition of $CaF_2$ can be suppressed in a supersaturation magnification of about 20 times to 25 times. In the case of the source water, the supersaturation magnification is 7.6 times and is in a concentration such that scale generation can be suppressed by the addition of the scale inhibitor.

When the water recovery rate is 30%, the fluoride ions to the source water are concentrated in 6.5/0.7=9.3 (mg/l), and the calcium ions to the source water is concentrated in 135/0.7=193 (mg/l). Since ions slightly leak into the treated water (desalted water) in practice, the concentrations of the fluoride ions and the calcium ions in the case of the water recovery rate of 30%, as shown in Table 1, are reduced to 9.2 mg/l and 192 mg/l, respectively. As shown in Table 1, in the case of the water recovery rate of 30%, the supersaturation magnification reaches 21 times. When the water recovery rate is 50%, higher condensation is caused, and supersaturation magnification reaches 59 times. That is, when the seed crystals are not added, the water recovery rate of 30% is a limit in order not to generate scales in the desalinization unit.

The calculation results of the fluoride ion concentration and the calcium ion concentration in the wastewater and the supersaturation magnification of the calcium fluoride, when the wastewater is treated by adding the seed crystals by means of the wastewater treatment device of the first embodiment, are shown in Table 2. Table 2 shows a case where the fluoride ion concentration is reduced only in the pretreated water after the wastewater treatment performed by the wastewater treatment device of the first embodiment compared to in the source water.

TABLE 2

| | Pretreated Water | Water Recovery Rate 30% | Water Recovery Rate 50% | Water Recovery Rate 75% |
|---|---|---|---|---|
| Fluoride Ion (mg/l) | 3.7 | 5.2 | 7.4 | 14.8 |
| Calcium Ion (mg/l) | 135 | 192 | 270 | 540 |
| Calcium Fluoride Supersaturation Magnification (Times) | 2.5 | 6.8 | 20 | 156 |

As in Formula (1), the solubility product of the calcium fluoride to the water is proportional to the square of F-concentration. If the fluoride ion concentration in the wastewater before desalination treatment is reduced as shown in Table 2, generation of the scales is suppressed to the water recovery rate of 50%. That is, the recovery rate of the water after the desalination treatment can be improved by adding the seed crystals as in the present embodiment.

(Second Embodiment)

Figure 3:
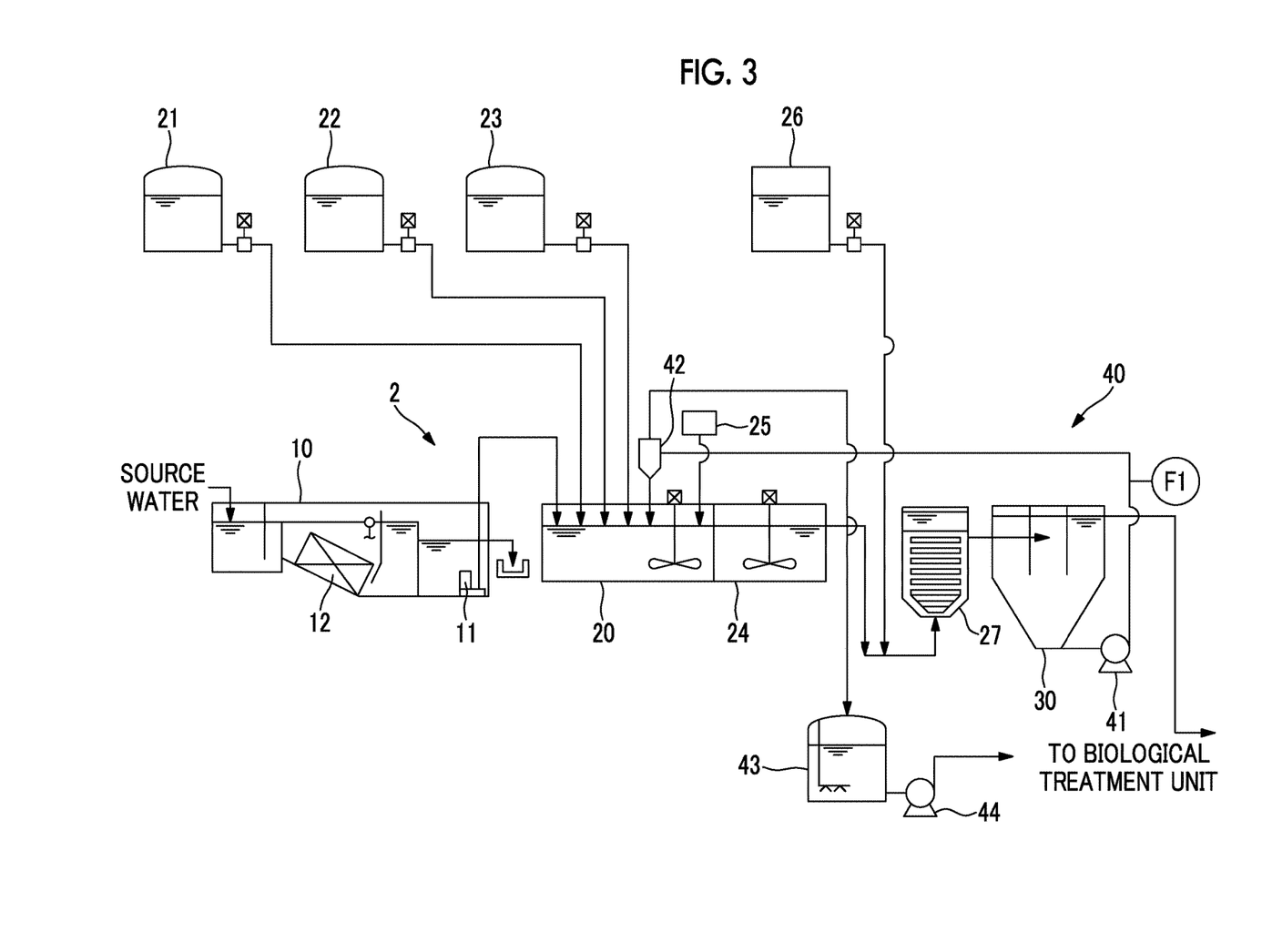
FIG. 3 is a schematic view of a pretreatment unit of a wastewater treatment device related to a second embodiment.

FIG. 3 is a schematic view of a pretreatment unit of a wastewater treatment device related to a second embodiment. The pretreatment unit 2 in the wastewater treatment device of the second embodiment is different from that in the wastewater treatment device of the first embodiment in that this pretreatment unit includes a circulation unit 40 that recovers the seed crystals precipitated in the precipitation tank 30 and re-feeds the seed crystals into the reaction vessel 20.

The circulation unit 40 includes a pump 41 and a cyclone 42.

The pump 41 discharges a slurry including the seed crystals from the bottom of the precipitation tank 30, and transports the slurry to the cyclone 42.

The cyclone 42 separates the seed crystals, the flocs (the chelate compounds and the suspended particles) and the sludge from the slurry. In order to facilitate the separation of the seed crystals and the other components, the seed crystals preferably have a size of about 0.03 mm to 1 mm. Additionally, the specific gravity of the seed crystals on which the fluoride compounds have been deposited is 1.5 g/cm$^3$ to 4.5 g/cm$^3$, whereas the specific gravity of the suspended particles or the like in the wastewater is about 1.01 g/cm$^3$. In this way, since the seed crystals on which the fluoride compounds have been deposited have a large specific gravity and large sizes, the seed crystals are accumulated on the bottom of the cyclone 42 by the cyclone 42. The accumulated seed crystals are fed into the reaction vessel 20 from the bottom of the cyclone 42.

Since the flocs of the chelate compounds and the suspended particles of the heavy metal, and the sludge have small specific gravities and small sizes compared to the seed crystals, the flocs and the sludge are discharged out of the cyclone 42 as a slurry. The slurry discharged from the cyclone 42 is first stored in the slurry tank 43, and is then discharged as a drain out of the system of the wastewater treatment device by the pump 44.

As described in the first embodiment, the seed crystals on which the fluoride compounds are deposited and that are enlarged are appropriately divided. The seed crystals that are finely divided are discharged out of the system of the wastewater treatment device together with the sludge or the like by the cyclone 42. The seed crystals equivalent to those discharged are replenished from the seed crystal feeding unit 25. The amount of replenishment of the seed crystal is appropriately set according to the seed crystal concentration. The seed crystal concentration is measured from, for example, the wastewater extracted from the aging tank 24.

The wastewater treatment device of the second embodiment, similar to in the first embodiment, can transport the wastewater, which has a low fluoride ion concentration and does not contain the suspended particles, to the desalinization unit. For this reason, generation of scales in the reverse osmosis membrane or the ion exchange membrane of the desalinization unit can be suppressed. Moreover, since the precipitated seed crystals are recovered and reused, the utilization efficiency of the seed crystals is improved.

(Third Embodiment)

Figure 4:
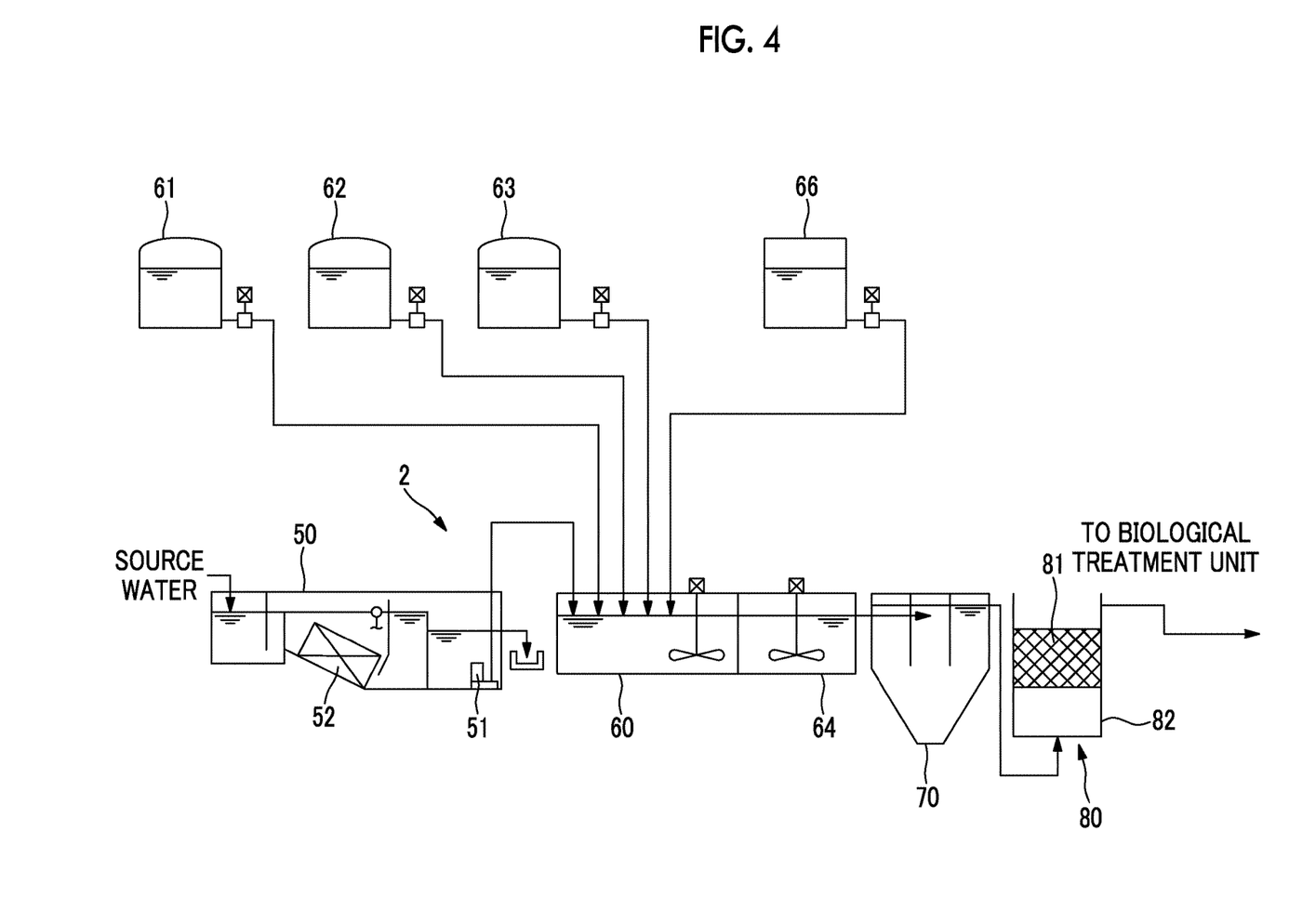
FIG. 4 is a schematic view of a wastewater treatment device related to a third embodiment.

FIG. 4 is a schematic view of a wastewater treatment device related to a third embodiment.

The pretreatment unit of the wastewater treatment device of the third embodiment includes the same oil separation device 50, reaction vessel 60, aging tank 64, and precipitation tank 70 as those of the first embodiment. In the third embodiment, the seed crystal feeding unit and granulation tank of the first embodiment are not installed. A chelate tank 61, a flocculant tank 62, an alkali tank 63, and a polymer tank 66 are connected to the reaction vessel 60.

In the wastewater treatment device of the third embodiment, a fluoride concentration reduction unit 80 is installed between the pretreatment unit 2 and the biological treatment unit 3. The fluoride concentration reduction unit 80 stores a fluidized bed 81 inside a vessel 82. The seed crystals of the fluidized bed 81 on which the fluoride compounds can be deposited are filled into the vessel into which the wastewater can flow. Rock phosphate or the like is used as the seed crystals in the present embodiment.

The precipitation tank 70 is connected to the bottom of the fluoride concentration reduction unit 80. The fluoride concentration reduction unit 80 is connected to the biological treatment unit.

The wastewater discharged from the precipitation tank 70 is supplied from the bottom of the fluoride concentration reduction unit 80 to the inside of the vessel 82. The water surface of the wastewater within the vessel 82 is set to a position higher than the fluidized bed 81. That is, the fluidized bed 81 is immersed in the wastewater within the vessel 82. If the wastewater is supplied into the vessel 82 from the bottom of the fluoride concentration reduction unit 80, the wastewater passes through the fluidized bed from the bottom toward the top. At this time, the fluoride ions and the calcium ions in the wastewater are deposited on the surfaces of the seed crystals of the fluidized bed 81 as the fluoride compounds. Accordingly, the fluoride ion concentration in the wastewater is reduced. The wastewater of which the fluoride ion concentration is reduced is discharged out of the fluoride concentration reduction unit 80 from the vicinity of the water surface, and is transported to the biological treatment unit 3.

In the third embodiment, the seed crystals that have been discharged from the fluidized bed 81 may be discharged from the fluoride concentration reduction unit 80. In this case, the seed crystals are separated from the wastewater by being passed through MBR of the biological treatment unit 3. Accordingly, also in the third embodiment, the wastewater transported to the desalinization unit 4 does not contain the suspended particles while the fluoride ion concentration thereof is reduced.

(Fourth Embodiment)

Figure 5:
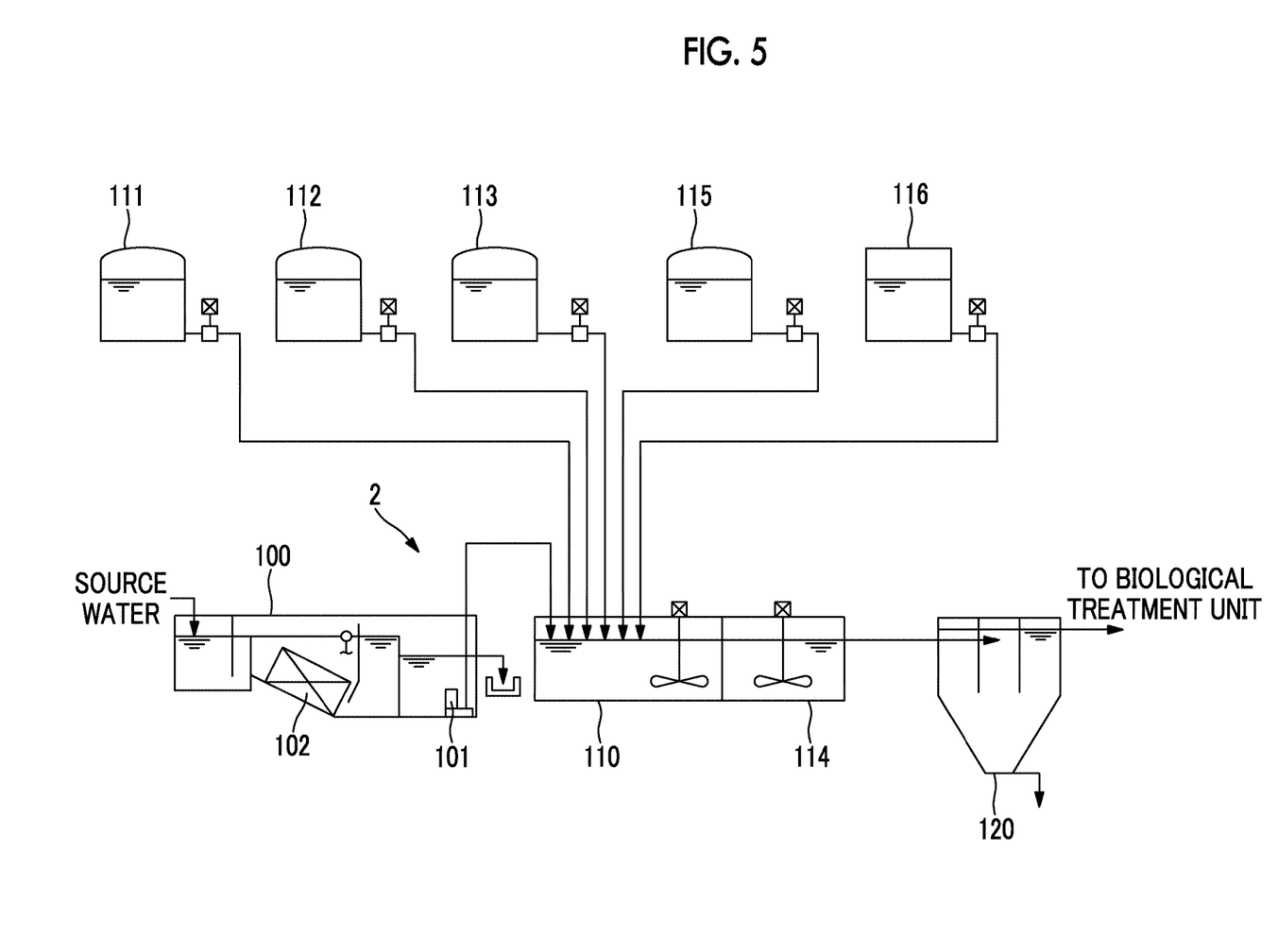
FIG. 5 is a schematic view of a pretreatment unit of a wastewater treatment device related to a fourth embodiment.

FIG. 5 is a schematic view of a pretreatment unit of a wastewater treatment device related to a fourth embodiment. The pretreatment unit of the wastewater treatment device of the fourth embodiment includes the same oil separation device 100, reaction vessel 110, aging tank 114, and precipitation tank 120 as those of the first embodiment. The oil separation device 100 includes a submerged pump 101 and an oil separator 102. A chelate tank 111, a flocculant tank (first flocculant tank) 112 that holds an iron-based flocculant, an alkali tank 113, and a polymer tank 116 are connected to a reaction vessel 110. A flocculant tank (second flocculant tank) 115 is connected to the reaction vessel 110 or the aging tank 114. When the flocculant tank 115 is connected to the reaction vessel 110, the connection may be made so that feeding is performed in the vicinity of a partition wall on a boundary between the reaction vessel 110 and the aging tank 114. In the fourth embodiment, the granulation tank and the seed crystal feeding unit are not installed.

In the fourth embodiment, the flocculant tank 115 stores an aluminum-based flocculant. The aluminum-based flocculant includes polyaluminum chloride (PAC), an aluminum sulfate ($Al_2(SO_4)_3 \cdot 18H_2O$), or the like. That is, in the fourth embodiment, the fluoride concentration reduction unit is constituted by the flocculant tank 115 (flocculant feeding unit), the reaction vessel 110, and the precipitation tank 120 (precipitation unit).

In the wastewater treatment device of the fourth embodiment, the aluminum-based flocculant is added from the second flocculant tank 115 to the wastewater in the reaction vessel 110. pH in the reaction vessel 110 is adjusted to about 6 to 8 (neutral). If pH of the wastewater is neutral, $Al(OH)_3$ is deposited from the added aluminum-based flocculant. At this time, fluoride is incorporated into $Al(OH)_3$. For this reason, the fluoride ion concentration in the wastewater is reduced.

The wastewater containing $Al(OH)_3$ deposit incorporating fluoride is transported to the precipitation tank 120, and the $Al(OH)_3$ deposit precipitates at the bottom of the precipitation tank 120 together with the sludge in the precipitation tank 120, and is discharged from the precipitation tank 120.

In addition, in the fourth embodiment, the circulation unit circulates a portion of the slurry containing the $Al(OH)_3$ deposit and the sludge to the aging tank 114 that are discharged from the precipitation tank 120 is provided. The remainder of the slurry discharged from the precipitation tank 120 is discharged out of the system of the wastewater treatment device via the slurry tank.

Also in the fourth embodiment, the fluoride ion concentration in the wastewater transported to the biological treatment unit is reduced compared to the source water. Additionally, even if the deposit is discharged from the pretreatment unit, it is possible to separate the wastewater and the deposit by the biological treatment unit at the subsequent stage. For this reason, also in the fourth embodiment, the wastewater transported to the desalinization unit does not contain the suspended particles while the fluoride ion concentration thereof is reduced.

EXAMPLES

Example 1

A wastewater treatment experiment was conducted using imitation water shown in Table 3. pH of the imitation water was 8.4.

TABLE 3

| | |
|---|---|
| NaCl | 723 (mg/l) |
| $NaHCO_3$ | 405 (mg/l) |
| $CaCl_2$ | 136 (mg/l) |
| $Na_2SO_4$ | 564 (mg/l) |
| NaF | 14 (mg/l) |

The experiment was performed in the following processes. (1) in Cases 1 and 2, $CaCl_2$: 62 mg/l and $Na_2HPO_4$: 146 mg/l were added to the imitation water. In Cases 3 and 4, $CaCl_2$: 62 mg/l, $Na_2HPO_4$: 146 mg/l, and rock phosphate: 1000 mg/l were added to the imitation water. pH of the imitation water was adjusted to about 7, using an HCl water solution, in the respective cases.

(2) The imitation water to which a reagent was added in Process (1) was stirred. Stirring time was 30 minutes in Cases 1 and 3 and was 120 minutes in Cases 2 and 4.

(3) After the stirring of Process (2), $FeCl_3$: 100 mg/l was added to the imitation water and pH of the imitation water was adjusted to about 7, using the HCl water solution. Then, stirring was performed for 5 minutes.

(4) An anionic polymer (Hishifloc 305): 1 mg/l was added to the imitation water. Then, stirring was performed for 15 minutes.

(5) The imitation water after the stirring of Process (4) was allowed to stand for 5 minutes, and an insoluble substance was precipitated in the treated water. Supernatant liquids were extracted and the fluoride ion concentrations thereof were analyzed.

Table 4 shows the fluoride ion concentrations and the fluoride (F) elimination rates in the imitation water and in the supernatant liquids after treatment in Cases 1 to 4. The F elimination rates were calculated as {1−(fluoride ion concentration of supernatant liquid)/(fluoride ion concentration of imitation water)}×100(%).

TABLE 4

| Sample Name | F (mg/l) | F Elimination Rate (%) |
|---|---|---|
| Imitation Water | 6.5 | — |
| Case 1 | 6.5 | 0 |
| Case 2 | 6.3 | |
| Case 3 | 5.4 | 17 |
| Case 4 | 5.5 | |

Elimination of the fluoride ions was confirmed in Cases 3 and 4, to which the rock phosphate was added.

Example 2

The rock phosphate used in Example 1 was ground by a mortar. The rock phosphate ground into a size from about 0.03 mm to 1 mm on conditions of Case 3 was added, and the operation of processes (1) to (5) of Example 1 was performed. In addition, the additive amounts of the rock phosphate were 1000 mg/l, 2000 mg/l, and 3000 mg/l.

The respective ion concentrations and fluoride elimination rates in the treated water are shown in Table 5.

TABLE 5

| Additive Amount of Rock Phosphate | Treated Water Quality (mg/l) | | | F Elimination |
|---|---|---|---|---|
| (mg/l) | F | PO$_4$ | Ca | Rate (%) |
| 1,000 | 4.1 | 15.6 | 42 | 37 |
| 2,000 | 3.7 | 10.0 | 40 | 43 |
| 3,000 | 3.7 | 6.0 | 42 | 43 |

The elimination rates of the fluoride ions were improved by adding the ground rock phosphate. In the rock phosphate additive amount of 2000 mg/l, the fluoride elimination rates were improved compared to in the case of 1000 mg/l. However, when the rock phosphate additive amount was 3000 mg/l, only the elimination effect substantially equal to that of 2000 mg/l was obtained. That is, for efficiently eliminating the fluoride ions in the wastewater, it is believed that there is an optimal rock phosphate additive amount.

As shown in Example 2, the concentration of the rock phosphate required in order to reduce the fluoride ion concentration in the imitation water to about half is about 2000 mg/l, and is significantly high compared to the fluoride ion concentration (6.5 mg/l) of the imitation water. Accordingly, it can be said that it is industrially advantageous to adopt a configuration in which the seed crystals (rock phosphate) are circulated, as in the aforementioned second embodiment.

REFERENCE SIGNS LIST

1: wastewater treatment device
2: pretreatment unit
3: biological treatment unit
4: desalinization unit
10, 50, 100: oil separation device
11, 51, 101: submerged pump
12, 52, 102: oil separator
20, 60, 110: reaction vessel
21, 61, 111: chelate tank
22, 62, 112, 115: flocculant tank
23, 63, 113: alkali tank
24, 64, 114: aging tank
25: seed crystal feeding unit
26, 66, 116: polymer tank
27: granulation tank
30, 70, 120: precipitation tank
40: circulation unit
41: pump
42: cyclone
43: slurry tank
44: pump
80: fluoride concentration reduction unit
81: fluidized bed
82: vessel

The invention claimed is:

1. A wastewater treatment method comprising:
providing wastewater to a wastewater treatment device, the wastewater treatment device comprising:
    a biological treatment unit that decomposes and eliminates organic matter in wastewater by means of microorganisms, the biological treatment unit comprising a membrane bio-reactor and/or a bio-film reactor;
    a desalinization unit that is provided downstream of the biological treatment unit, eliminates salt-forming ionic components from within the wastewater, and has an electrostatic desalinization device comprising a pair of porous electrodes that face each other, wherein an anion-exchanged membrane is installed on a positive electrode side, and a cation-exchange membrane is installed on a negative electrode side; and
    a fluoride concentration reduction unit that is provided upstream of the biological treatment unit and reduces the concentration of fluoride ions in the wastewater by eliminating the fluoride ions from within the wastewater, the fluoride concentration reduction unit comprising a reaction vessel, and an aging tank and a precipitation tank that are provided downstream of the reaction vessel,
wherein the fluoride concentration reduction unit includes a seed crystal feeding unit that feeds seed crystals into the wastewater, and
wherein a retention time of the wastewater in the aging tank is set so as to be longer than a retention time in the reaction vessel.

2. The wastewater treatment method according to claim 1, the wastewater treatment device further comprising: a circulation unit that precipitates the seed crystals having a size of 0.03 mm to 1 mm after salts containing fluoride are deposited, and re-feeds the precipitated seed crystals into the wastewater, the circulation unit comprising a pump and a cyclone.

3. A wastewater treatment method comprising:
providing wastewater to a wastewater treatment device, the wastewater treatment device comprising:
    a biological treatment unit that decomposes and eliminates organic matter in wastewater by means of microorganisms, the biological treatment unit comprising a membrane bio-reactor and/or a bio-film reactor;
    a desalinization unit that is provided downstream of the biological treatment unit, eliminates salt-forming ionic components from within the wastewater, and has an electrostatic desalinization device comprising a pair of porous electrodes that face each other, wherein an anion-exchanged membrane is installed on a positive electrode side, and a cation-exchange membrane is installed on a negative electrode side; and
    a fluoride concentration reduction unit that is provided upstream of the biological treatment unit and reduces the concentration of fluoride ions in the wastewater by eliminating the fluoride ions from within the wastewater, the fluoride concentration reduction unit comprising a reaction vessel, and an aging tank and a precipitation tank that are provided downstream of the reaction vessel, wherein the fluoride concentration reduction unit includes a fluidized bed vessel, comprising a fluidized bed that is stored within the fluidized bed vessel and stores seed crystals therein, and wherein when the wastewater is supplied from a lower side of the fluidized bed vessel, and when the wastewater passes through the fluidized bed, salts containing fluoride are deposited on the surfaces of the seed crystals to reduce the concentration of the fluoride ions in the wastewater, and wherein a retention time of the wastewater in the aging tank is set so as to be longer than a retention time in the reaction vessel.

4. A wastewater treatment method comprising:

providing wastewater to a wastewater treatment device, the wastewater treatment device comprising:

a biological treatment unit that decomposes and eliminates organic matter in wastewater by means of microorganisms, the biological treatment unit comprising a membrane bio-reactor and/or a bio-film reactor;

a desalinization unit that is provided downstream of the biological treatment unit, eliminates salt-forming ionic components from within the wastewater, and has an electrostatic desalinization device comprising a pair of porous electrodes that face each other, wherein an anion-exchanged membrane is installed on a positive electrode side, and a cation-exchange membrane is installed on a negative electrode side; and a fluoride concentration reduction unit that is provided upstream of the biological treatment unit and reduces the concentration of fluoride ions in the wastewater by eliminating the fluoride ions from within the wastewater, the fluoride concentration reduction unit comprising a reaction vessel, and an aging tank and a precipitation tank that are provided downstream of the reaction vessel, wherein the fluoride concentration reduction unit includes a flocculant feeding unit that feeds an aluminum-based flocculant into the wastewater, the flocculant feeding unit comprising a flocculant tank that stores the aluminum-based flocculant, and wherein a retention time of the wastewater in the aging tank is set so as to be longer than a retention time in the reaction vessel.

* * * * *

UNITED STATES PATENT AND TRADEMARK OFFICE
CERTIFICATE OF CORRECTION

PATENT NO. : 9,868,656 B2
APPLICATION NO. : 14/358054
DATED : January 16, 2018
INVENTOR(S) : Kazuhide Kamimura et al.

It is certified that error appears in the above-identified patent and that said Letters Patent is hereby corrected as shown below:

On the Title Page

Item (73):
Change:
(73) Assignees: "MITSUBISHI HEAVY INDUSTRIES MECHATRONICS SYSTEMS, Kobe-shi (JP)"

To be:
(73) Assignees: --MITSUBISHI HITACHI POWER SYSTEMS ENVIRONMENTAL SOLUTIONS, LTD, Kanagawa (JP)--

Signed and Sealed this
Thirtieth Day of October, 2018

Andrei Iancu
*Director of the United States Patent and Trademark Office*